United States Patent
Wickman et al.

(10) Patent No.: US 6,795,624 B2
(45) Date of Patent: Sep. 21, 2004

(54) ELECTRO-OPTIC INTERCONNECT CIRCUIT BOARD

(75) Inventors: Randy W. Wickman, Cadott, WI (US); Gary P. O'Connor, Bolingbrook, IL (US); John Greene, Chippewa Falls, WI (US); Daniel C. Mansur, Chippewa Falls, WI (US); David Barneson, Eleva, WI (US)

(73) Assignee: Corona Optical Systems, Inc., Lombard, IL (US)

( * ) Notice: Subject to any disclaimer, the term of this patent is extended or adjusted under 35 U.S.C. 154(b) by 0 days.

(21) Appl. No.: 10/352,472

(22) Filed: Jan. 28, 2003

(65) Prior Publication Data

US 2003/0219217 A1 Nov. 27, 2003

Related U.S. Application Data

(62) Division of application No. 09/941,260, filed on Aug. 28, 2001, now Pat. No. 6,600,853.
(60) Provisional application No. 60/234,138, filed on Sep. 21, 2000.

(51) Int. Cl.[7] .............................. G02B 6/43; G02B 6/12
(52) U.S. Cl. .............................. 385/52; 385/14; 385/89
(58) Field of Search .............................. 385/14, 24, 52, 385/88–92

(56) References Cited

U.S. PATENT DOCUMENTS

| | | | | |
|---|---|---|---|---|
| 5,790,730 A | * | 8/1998 | Kravitz et al. | 385/49 |
| 6,083,843 A | * | 7/2000 | Ohja et al. | 438/710 |
| 6,421,474 B2 | * | 7/2002 | Jewell et al. | 385/14 |
| 6,600,853 B2 | * | 7/2003 | Wickman et al. | 385/24 |

* cited by examiner

Primary Examiner—Hemang Sanghavi
Assistant Examiner—Omar Rojas
(74) Attorney, Agent, or Firm—Welsh & Katz, Ltd.

(57) ABSTRACT

A method and apparatus are provided for aligning a plurality of transmission paths of an array of optical devices with a plurality of optical fibers. The method includes the steps of disposing the optical array on a first side of the transparent substrate with the plurality of optical transmission paths passing directly through the substrate, disposing a signal processor on the first side of the transparent substrate adjacent the array of optical devices, disposing a set of alignment guides on a second side of the transparent substrate parallel to the plurality of transmission paths for aligning the plurality of optical fibers with the plurality of transmission paths and coupling a plurality of signals processed by the processor through the plurality of transmission paths between the optical array and plurality of optical fibers.

23 Claims, 7 Drawing Sheets

ELECTRO-OPTIC INTERCONNECT CIRCUIT BOARD

This is a divisional patent application of U.S. patent application Ser. No. 09/941,260, filed on Aug. 28, 2001 now U.S. Pat. No. 6,600,853, which is a continuation-in-part of U.S. Provisional Patent Application No. 60/234,138 filed on Sep. 21, 2000 (now abandoned).

FIELD OF THE INVENTION

The field of the invention relates to optical devices and more particularly to the communication of information signals using optical devices.

BACKGROUND OF THE INVENTION

Short electronic interconnects are often needed between semiconductor photonic devices such as lasers and photodiodes and electronic interface circuitry. This electronic circuitry could include photonic signal drivers and photonic signal receivers. This need for decreased distance between photonic devices and electrical interface circuitry increases as the signaling data rate increases.

Photonic components are often placed on simple carrier substrates to verify operation, to do burn-in, or simply to facilitate handling of that device. This photonic device and carrier substrate may then be placed on another substrate before additional packaging is completed. This packaging may add additional electrical interfaces, such as wire bonds and long non-controlled impedance wires, decreasing the electrical performance of the photonic device.

One example is an electro-optic TO can with an optical port. After placing the optical component in a can and making electrical wirebonds, further packaging must be done in the alignment to a fiber optic cable to the optical port. The additional packaging often involves placing structures around the TO can to support and align the fiber optic cable. The physical needs of the electrical connections and mechanical devices required for alignment often consume a great deal of space resulting in the introduction of significant distance between the optical device and the fiber. The physical need of the optical port also minimizes or eliminates the possibility of placing multiple optical devices on the same semiconductor substrate.

Some commonly used photonics devices (e.g., the vertical cavity surface emitting laser (VCSEL), photodiode structures, etc.) have both electrical contacts and optical ports on the same surface of the substrate. Placing optical ports and electrical contacts on a common surface particularly exacerbates packaging problems and optimization of the performance of these devices. These packaging problems are particularly exacerbated when more than one optical component is arrayed on a common substrate. Because of the importance of optical devices, a need exists for a simple yet reliable means of electrically and optically interconnecting such devices that does not rely upon trial and error.

SUMMARY

A method and apparatus are provided for aligning a plurality of transmission paths of an array of optical devices with a plurality of optical fibers. The method includes the steps of disposing the optical array on a first side of the transparent substrate with the plurality of optical transmission paths passing directly through the substrate, disposing a signal processor on the first side of the transparent substrate adjacent the array of optical devices, disposing a set of alignment guides on a second side of the transparent substrate parallel to the plurality of transmission paths for aligning the plurality of optical fibers with the plurality of transmission paths and coupling a plurality of signals processed by the processor through the plurality of transmission paths between the optical array and plurality of optical fibers.

DETAILED DESCRIPTION OF A PREFERRED EMBODIMENT

Figure 1:
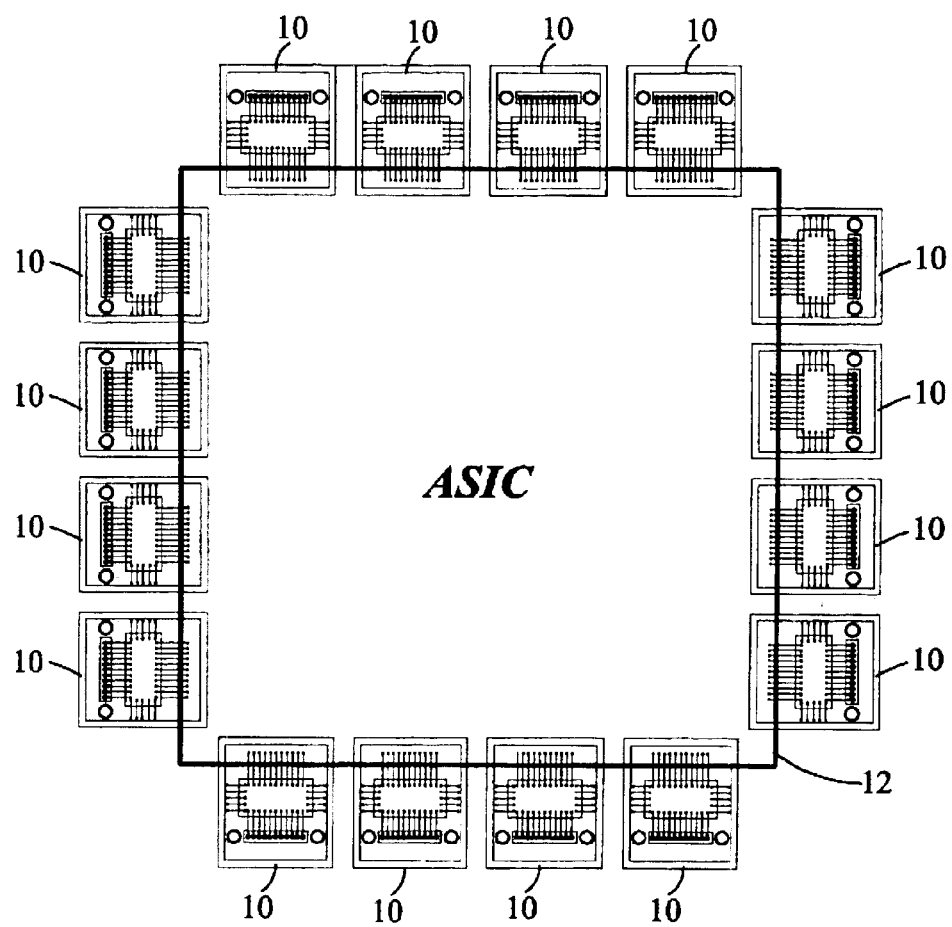
FIG. 1 shows an electro-optical converter cell in accordance with an illustrated embodiment of the invention, in a context of use.

FIG. 1 shows a signal processing assembly using a number of electro-optical converter assemblies (unit cells) 10 under an illustrated embodiment of the invention and in a context of use. The signal processing assembly includes a communications device (an application specific integrated circuit (ASIC)) 12 with a number of unit cells 10 distributed around a periphery of the communications ASIC 12 and which are electrically connected to the communications ASIC 12.

For example, the communications ASIC 12 may be an ultra-high speed router used as a hub in a communication system (e.g., Internet, PSTN, etc.). Further, the signal processing assembly of FIG. 1 provides an example of a device that may be mounted in a backplane of a rack in a communications cabinet.

Under the illustrated embodiment of FIG. 1, the router ASIC 12 may be a matrix switch with a number of connections and the ability of internally connecting any two external ports. Such devices 12 have great utility in routing signals (e.g., telephone signals, Internet protocol traffic, corporate Ethernet traffic, etc.).

Figure 5:
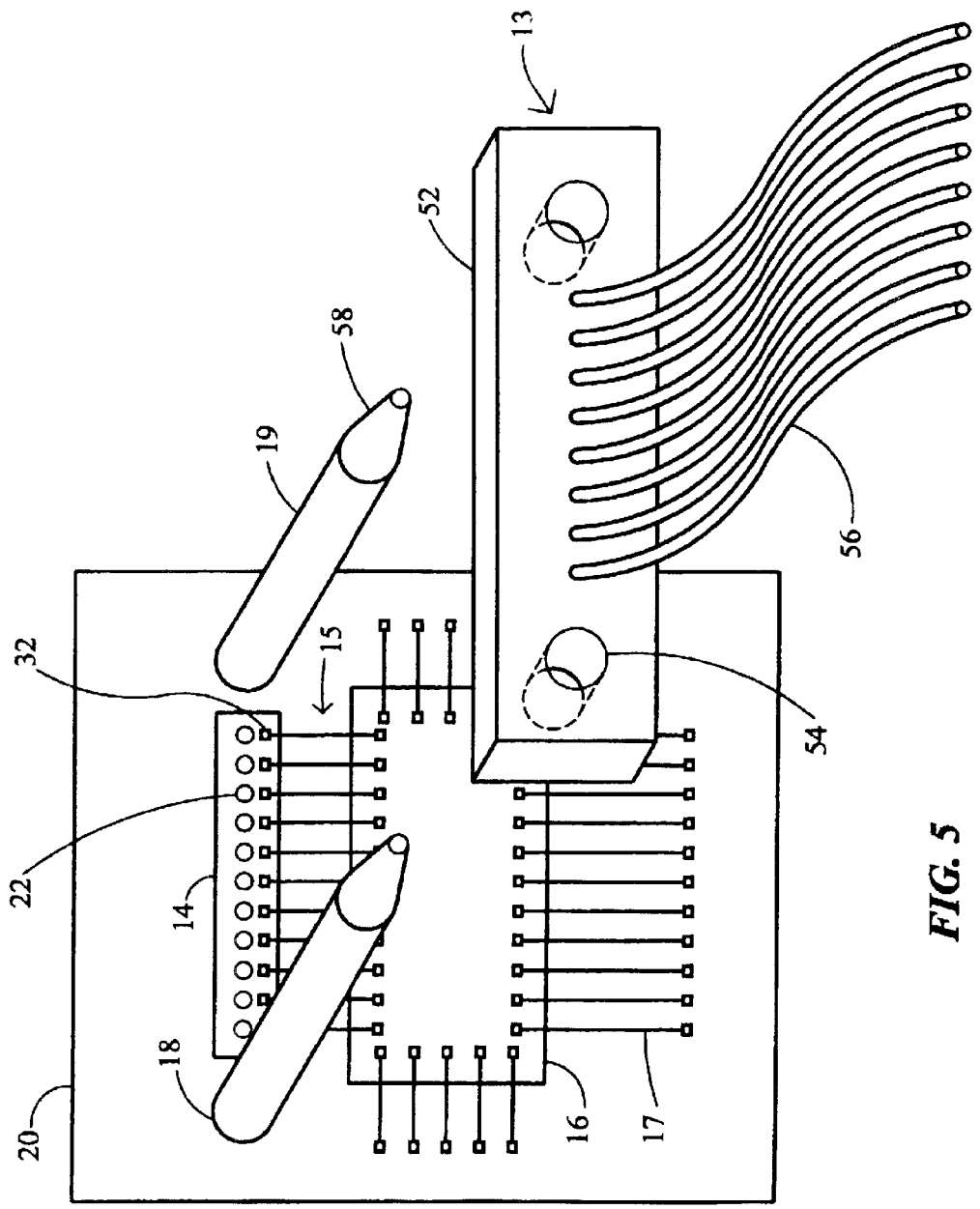
FIG. 5 depicts a connector and cell of FIG. 1.

The cells 10 may each form a number of electro-optical interfaces between the router 12 and external optical fibers through a waveguide connector 13 (FIG. 5). The waveguide connector 13, in turn, may engage and be aligned to the cell 10 through the interaction of an alignment guide 19 and receptacle 54.

Figure 2:
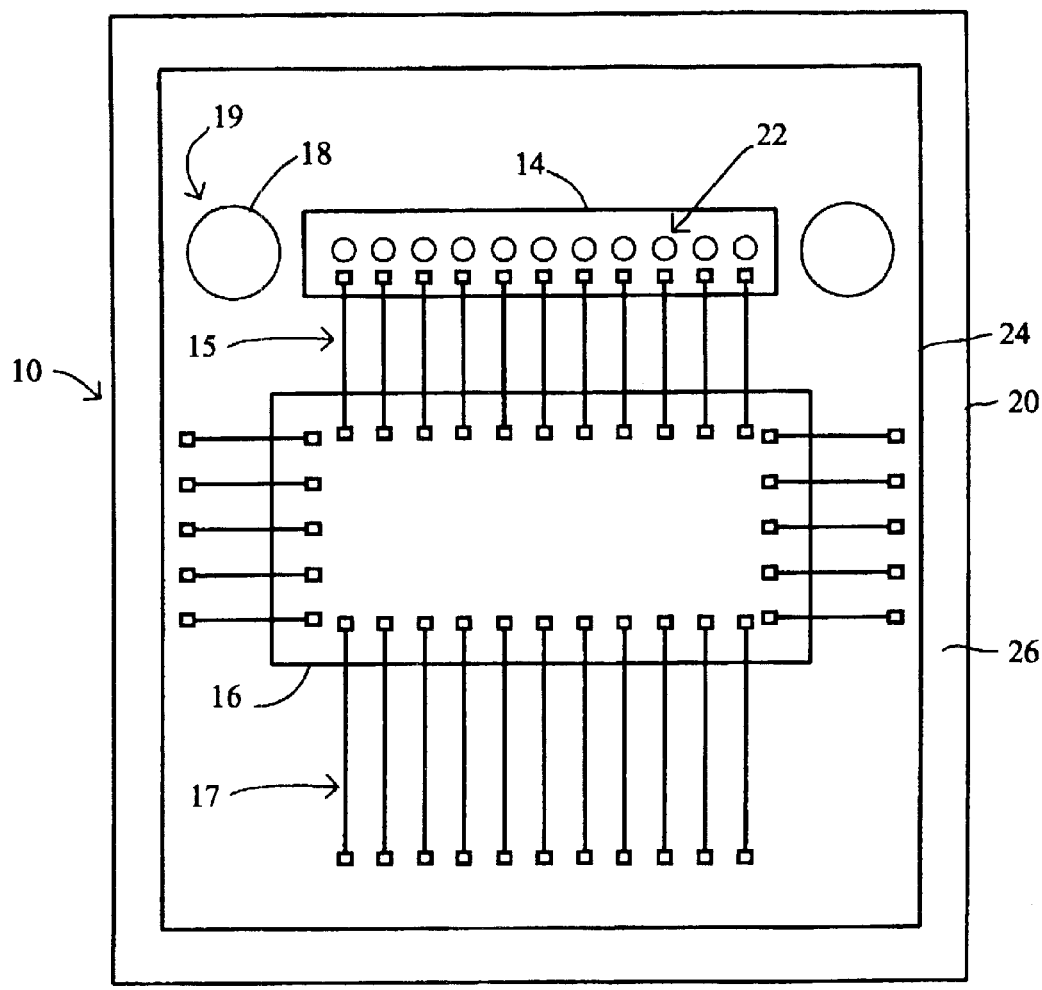
FIG. 2 depicts the electro-optical cell of FIG. 1.

FIG. 2 is a simplified view of one of the cells 10. As shown, the cell 10 may include an optical array 14, a signal processor 16 and a set of alignment guides 19 all disposed on a transparent substrate 20.

The optical array 14 may have a number of optical ports 22 (e.g., eleven ports shown in FIG. 2). Each port 22 may be a photonics transmitter (e.g., VCEL laser, DFB laser, etc.), a photonics receiver (e.g., a photodiode, PIN photodiode, etc.) or a combination transmitter/receiver.

The optical array 14 may be disposed on a first side of the substrate 20 in such a way as to transceive an optical signal along a number of optical paths that pass directly through a body of the substrate 20. The alignment guides 19 extend outwards from a second side of the substrate 20 and function to align a set of optical waveguides (e.g., optical fibers) 56 (FIG. 5) of the connector 13 to respective ports 22 of the optical array 14.

The signal processor 16 may be any of a number of signal processing devices. In the simplest configuration, the signal processor 16 may be an array of amplifiers. If the ports 22 are lasers, then the amplifiers may receive a driving signal from the router 12 on traces 17 and drive the lasers 22 through traces 15, accordingly. If the ports 22 are photodetectors, then signals received on traces 15 from the photodetectors are amplified within the signal processor 16 and are transferred to the router 12. Alternatively, if the array 14 is a mixture of lasers and photodetectors, then the signal processor 16 may simultaneously transfer signals in both directions.

Alternatively, the signal processor 16 may be a multiplexer and the ASIC 12 may be one or more Pentium III processors or digital signal processors (DSPs). Further, the number of electrical signal traces 17 supplying the multiplexer 16 may be much greater than the number of ports 22 necessary to service the data on those traces 17. The traces 17, in fact, may represent one or more data buses related to specific processors or functions of the ASIC 12.

The multiplexer 16 may contain an internal lookup table that relates specific buses to specific ports and to specific slots in those ports. Further, the allocation of slots to buses may be under the control of the ASIC 12.

As a further alternative and where the ASIC 12 are structured as one or more data processors, the signal processor 16, itself, may be a router. As each packet arrives on a bus 17, a header of the packet may be stripped off and decoded for a destination address. Upon recovering a destination address, the router 16 may recover routing information from a routing table identifying a particular port for transmitting to that destination. The router 16 may route the packet through the identified port 22 to the destination.

At a destination, a similar router 16 may receive and decode the packet. Upon decoding the packet, the router 16 may route the packet to an identified bus 17.

Because of the small electrical signals associated with the ports 22 (e.g., provided by photodiodes), the signal processor 16 may be placed as close as possible to the array 14 to maximize electrical signal integrity. FIG. 2, in fact, depicts the signal processor 16 placed on the same transparent substrate as the array 14. Since the substrate may be a relatively thin glass, the material of the substrate 20 may be shaped (e.g., provided with one or more 90 degree bends), but still remain rigid enough to maintain optical tolerances.

Glass also has a thermal expansion coefficient that is much closer to semiconductor devices 14, 16 (as compared to the metal substrates more commonly used in photonics packaging). This reduces temperature-induced misalignment between the packaged optical device shown in FIG. 2 and externally coupled optical fibers 56. Alignment features may also be placed in or on the substrate with micron or submicron accuracy, as described in more detail below. This greatly simplifies the alignment of the optical devices on the array 14 with optical fiber connectors 13 that may also have complementary alignment structures. Electrical traces may be placed on the opposite side of the substrate, to separate the electrical and optical interconnect requirements and simplifying packaging.

By multiplying the number of ports 22 in FIG. 2 by the number of cells 10 in FIG. 1, it may be observed that in the case where the ASIC is a router, the router 12 of FIG. 1 may form any of 16! (16 factorial) possible connections. By coupling the cells 10 directly to the router 12, the speed and switching capabilities of the combination shown in FIG. 1 may far exceed that possible with prior art devices.

Turning now to the cell 10, in specific, a brief description will be provided of the operational features and construction of the cell 10. Following a description of the cell 10, a description will be provided of the use of the cell 10 in conjunction with other devices (e.g., the router 12 of FIG. 1).

Figure 3:
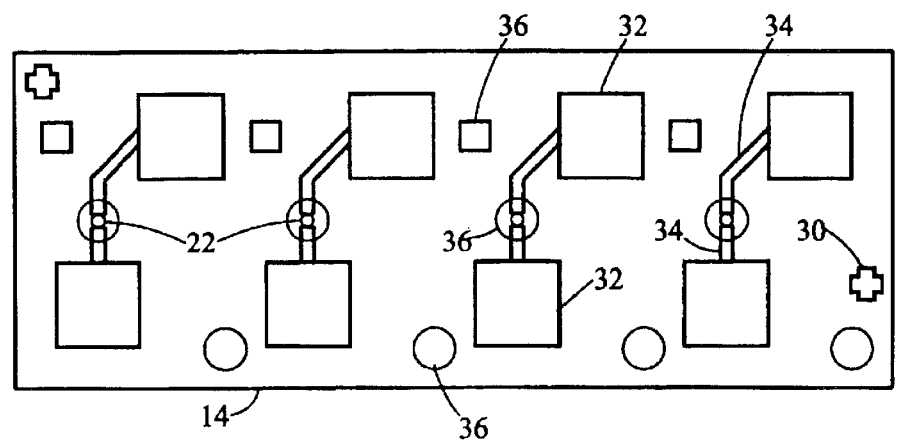
FIG. 3 depicts an optical array used in the cell of FIG. 1.

FIG. 3 depicts a view of the active side of the array 14. An axis of transmission of the ports 22 would be normal to the surface of the page of FIG. 3 (i.e., a laser 22 would transmit out of the page, a photodiode 22 would receive an optical signal transmitted into the page).

A series of connection pads 32 may be provided on the array 14 for purposes of making electrical connections with the active elements of the ports 22. Trace leads 34 may be used to interconnect the pads 32 with the ports 22.

Also present on the array 14 may be a registration target 36 surrounding each port 22. The registration targets 36 surrounding the ports 22 may be created during fabrication of the array 14 and may be precisely aligned to the axis of transmission of its respective port 22.

Similarly, the traces 15, 17 may be provided on the transparent substrate 20. The traces 15, 17 may be created by a conventional photolithographic process.

As a first step in assembly of the cell 10, the array 14 may be joined to the transparent substrate 20. Alignment is not especially important at this step in that the only criteria is that the solder pads of the array 14 contact the traces 15 disposed on the substrate 20. Other optical components (e.g., the optical processor 16) may be placed on the substrate, as shown in FIG. 2. Once the alignment with the traces 15, 17 has been made, the optical array 14 and signal processor 16 may be held in place by a mass rapid bonding process. Bonding could include adhesives, solder, stud bumps, or a similar material.

Figure 4:
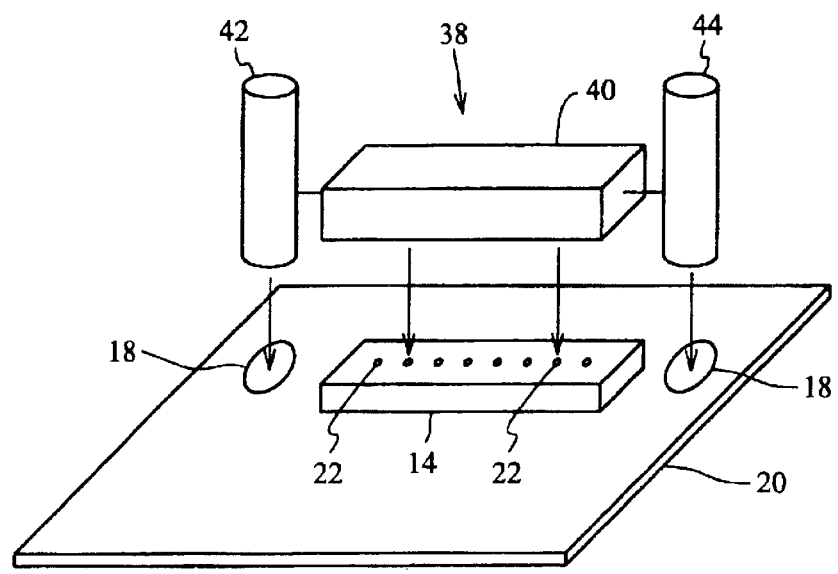
FIG. 4 depicts an alignment and boring fixture that may be used with the substrate of FIG. 1.

As a next step, a set of apertures 18 for receiving the alignment guides 19 may be formed in the transparent substrate 20. To form the apertures, a boring fixture 38 (FIG. 4) may be used. The boring fixture 38 may include a pattern recognition module 40 and lasers 42, 44. The pattern recognition module 40 may include software adapted to recognize and position itself over a line of targets.

Once recognition of the targets has occurred, the pattern recognition module 40 functions to identify a transverse line passing through the line of targets as well as a center point of the line of targets. The pattern recognition module 40 then positions its own transverse line and center point with the identified transverse line and center point. The lasers 42, 44 may be precisely aligned along the transverse line of the pattern recognition module 40. The lasers 42, 44 are also positioned a precise distance on either side of the center point of the pattern recognition module 40.

The pattern recognition module 40 may be programmed to view the array 14 through the transparent substrate 20 and identify the set of alignment targets 36 (e.g., the alignment targets 36 on opposing ends of the array 14). Once the pattern recognition module 40 has aligned itself with the registration targets 36 (and also the lasers 42, 44 on either side of the targets 36), the boring fixture 38 activates the lasers 42, 44 to ablate the holes 18 in precise alignment with the ports 22.

To complete assembly of the cell 10, a set of alignment pins 19 may be inserted into the holes 18, as shown in FIG. 5. Also shown in FIG. 5 is the waveguide connector 13 of FIG. 1 that engages the cell 10.

Included within the waveguide connector 13 may be a connector block 52 with a set of alignment apertures 54. As the set of apertures 54 engages the pins 19, a taper 58 on the pins 19 functions to align the block 52 with the substrate. As the block 52 engages the pins 19, the fibers 56 are brought into alignment with respective ports 22.

Figure 6:
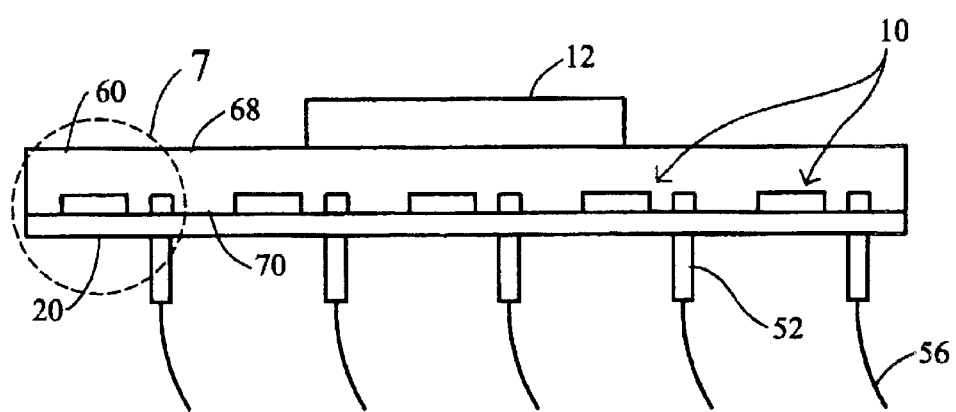
FIG. 6 depicts an alternate embodiment of the system of FIG. 1.
Figure 7:
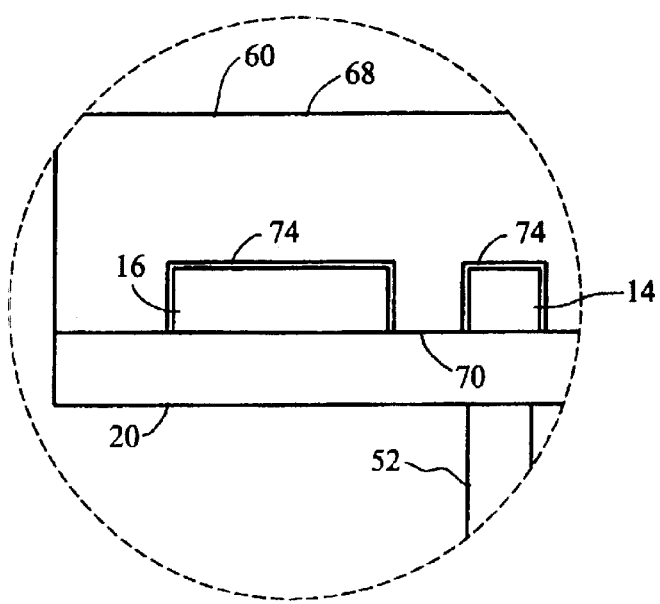
FIG. 7 depicts details of the system in FIG. 6.

FIG. 6 shows an alternate embodiment of the invention. As shown, the router 12 may be disposed on a printed circuit board (PCB) or ASIC 60. The optical unit cells 10 may be disposed onto the PCB or ASIC package 60 around the periphery of the package 60. FIG. 7 is a greatly enlarged section of FIG. 6. The package may contain spaces for the electrical and optical IC's, 14 and 16 respectively, to fit into, and they may be connected to the package using any appropriate technology (e.g., adhesives, solder, stud bumps, etc.).

Figure 8:
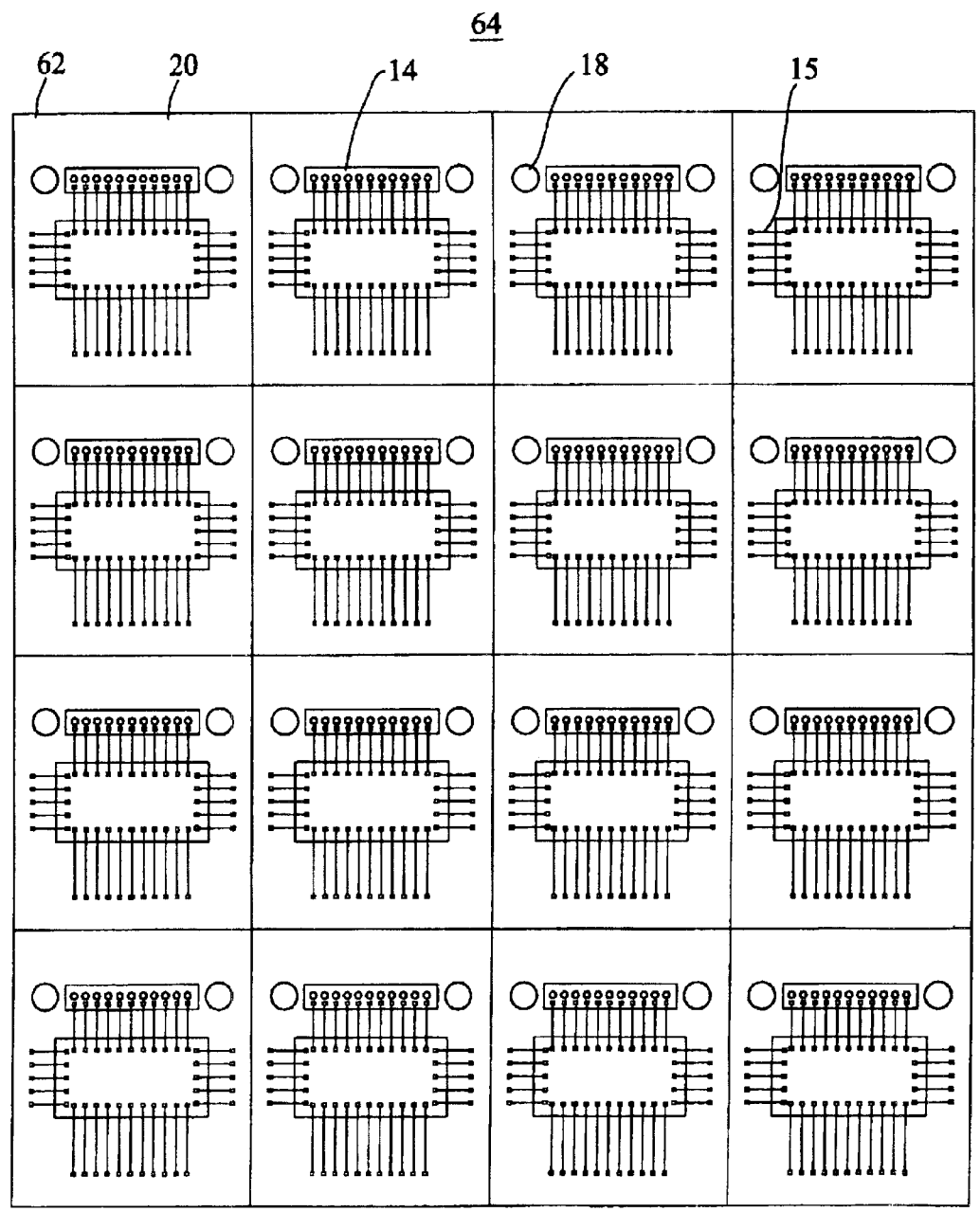
FIG. 8 depicts a further alternate embodiment of the system of FIG. 1.

In another embodiment of FIG. 7, a number of unit cells 10 may be constructed on a single large substrate 62. These cells could be constructed together on the large substrate 62 (FIG. 8) to from a large array 64 of cells 10. These arrays of cells 10 may function as an Electro-Optic circuit board.

Figure 9:
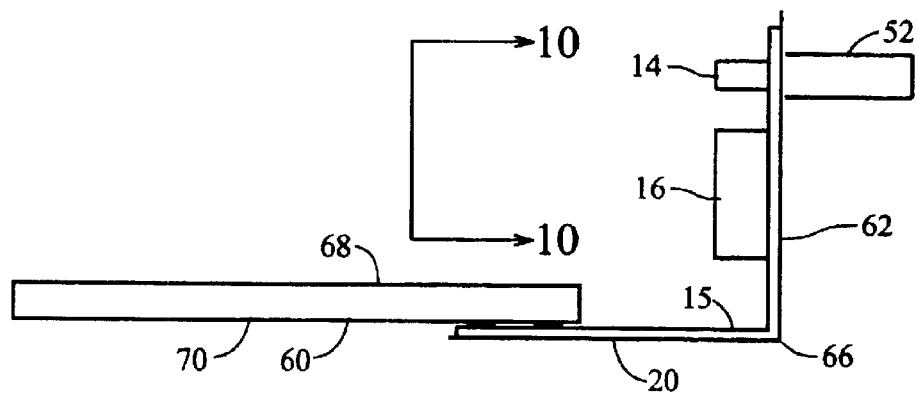
FIG. 9 depicts a further alternate embodiment of the system of FIG. 1.
Figure 10:
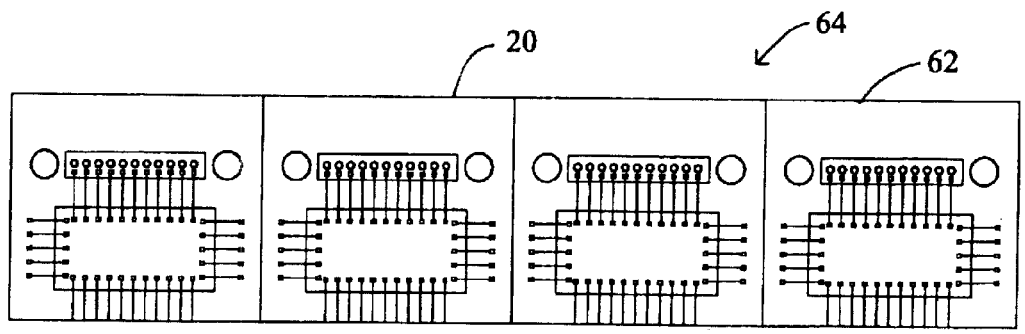
FIG. 10 depicts an array of electro-optical cells used in the embodiment shown in FIG. 9.

Further, as shown in FIGS. 9 and 10, the substrate 62 may be physically divided into rows, and each row of substrates provided with a 90 degree bend 66 along its longitudinal axis. The use of the bend 66 may allow the PCB 60 to be attached to a mother board, while simplifying the attachment of the optical connector 13.

Optionally, a number of cells 10 (FIG. 2) may be formed with a 90 degree bend 66 and attached to the communications device 12 as shown in FIG. 9. As above, the cells 10 may be mechanically and electrically connected to the device 12 using any appropriate technology (e.g., adhesives, solder, stud bumps, etc.).

A specific embodiment of a method and apparatus for coupling an optical array to optical waveguides has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of aligning an optical array to an alignment guide comprising the steps of:
    disposing the optical array on an optically transparent substrate;
    optically recognizing a plurality of registration targets of the optical array through the optically transparent substrate; and
    aligning the alignment guide with the optically recognized registration targets.

2. The method of aligning the optical array to the alignment guide as in claim 1 wherein the step of optically recognizing the plurality of registration targets further comprises automatically recognizing the plurality of registration targets.

3. The method of aligning the optical array to the alignment guide as in claim 1 wherein the step of optically recognizing the plurality of registration targets further comprises identifying a transverse line passing through the plurality of registration targets.

4. The method of aligning the optical array to the alignment guide as in claim 3 wherein the step of identifying the transverse line passing through the plurality of registration targets further comprises locating a center point of the transverse line.

5. The method of aligning the optical array to the alignment guide as in claim 4 further comprising defining a registration target of the plurality of registration targets as surrounding an optical port of the optical array.

6. The method of aligning the optical array to the alignment guide as in claim 4 further comprising aligning a pattern recognition module of a boring fixture over the plurality of registration targets so that a transverse line and center point of the pattern recognition module coincide with the transverse line and center of the transverse line of the registration targets.

7. The method of aligning the optical array to the alignment guide as in claim 6 further comprising locating a laser along the transverse line of the pattern recognition module a predetermined distance from the center point of the transverse line of the pattern recognition module.

8. The method of aligning the optical array to the alignment guide as in claim 7 wherein the step of locating the laser further comprises ablating an aperture in the optically transparent substrate on the transverse line at the predetermined distance from the center of the transverse line of the plurality of registration targets.

9. The method of aligning the optical array to the alignment guide as in claim 8 wherein the step of ablating the aperture in the optically transparent substrate on the transverse line at the predetermined distance from the center of the transverse line of the plurality of registration targets further comprises ablating a second aperture along the transverse line of the registrations targets at the predetermined distance from the transverse line of the plurality of registration targets on an opposite side of the center point.

10. The method of aligning an optical array to an alignment guide as in claim 8 further comprising disposing the alignment guide in the ablated aperture.

11. An apparatus for aligning an optical array to an alignment guide comprising:
    the optical array disposed on an optically transparent substrate;
    means for optically recognizing a plurality of registration targets of the optical array through the optically transparent substrate; and
    means for aligning the alignment guide with the optically recognized registration targets.

12. The apparatus for aligning the optical array to the alignment guide as in claim 11 wherein the means for optically recognizing the plurality of registration targets further comprises means for automatically recognizing the plurality of registration targets.

13. The apparatus for aligning the optical array to the alignment guide as in claim 11 wherein the means for optically recognizing the plurality of registration targets further comprises means for identifying a transverse line passing through the plurality of registration targets.

14. The apparatus for aligning the optical array to the alignment guide as in claim 13 wherein the means for identifying the transverse line passing through the plurality of registration targets further comprises means for locating a center point of the transverse line.

15. The apparatus for aligning the optical array to the alignment guide as in claim 14 further comprising defining a registration target of the plurality of registration targets as surrounding an optical port of the optical array.

16. The apparatus for aligning the optical array to the alignment guide as in claim 14 further comprising means for aligning the means for recognizing over the plurality of registration targets so that a transverse line and center point of the means for recognizing coincide with the transverse line and center of the transverse line of the registration targets.

17. The apparatus for aligning the optical array to the alignment guide as in claim 16 further comprising a laser located along the transverse line of the means for recognizing a predetermined distance from the center point of the transverse line of the means for recognizing for boring an aperture in the optically transparent substrate on the transverse line at the predetermined distance from the center of the transverse line of the plurality of registration targets.

18. The apparatus for aligning an optical array to an alignment guide as in claim 17 further comprising the alignment guide disposed in the bored aperture.

19. An apparatus for aligning an optical array to an alignment guide, such apparatus comprising:

the optical array disposed on an optically transparent substrate;

a plurality of registration targets that are optically recognizable through the optically transparent substrate; and a boring fixture adapted to recognize the plurality of registration targets through the optically transparent substrate.

20. The apparatus for aligning the optical array to the alignment guide as in claim 19 wherein the boring fixture further comprises a pattern recognition module adapted to automatically recognize the plurality of registration targets and align the boring fixture over a transverse line and center point of the plurality of registration targets.

21. The apparatus for aligning the optical array to the alignment guide as in claim 20 wherein the boring fixture further comprising a laser located a predetermined distance from a center point of the pattern recognition module for boring an aperture in the optically transparent substrate on the transverse line at the predetermined distance from the center of the plurality of registration targets.

22. The apparatus for aligning an optical array to an alignment guide as in claim 21 further comprising the alignment guide disposed in the bored aperture.

23. The apparatus for aligning the optical array to the alignment guide as in claim 19 further comprising defining a registration mark of the plurality of registration marks as surrounding an optical port of the optical array.

* * * * *